Aug. 30, 1966  W. N. CARSON, JR  3,269,868
RESERVE PRIMARY CELL
Filed April 22, 1963
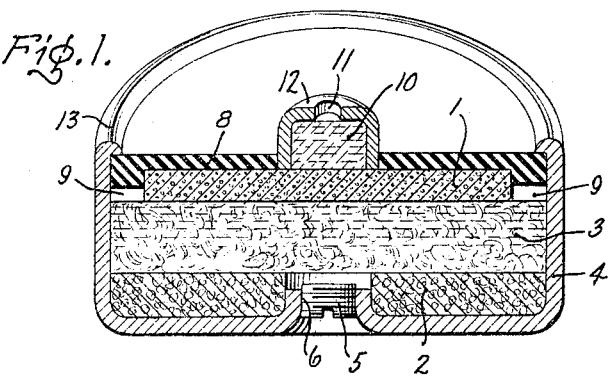
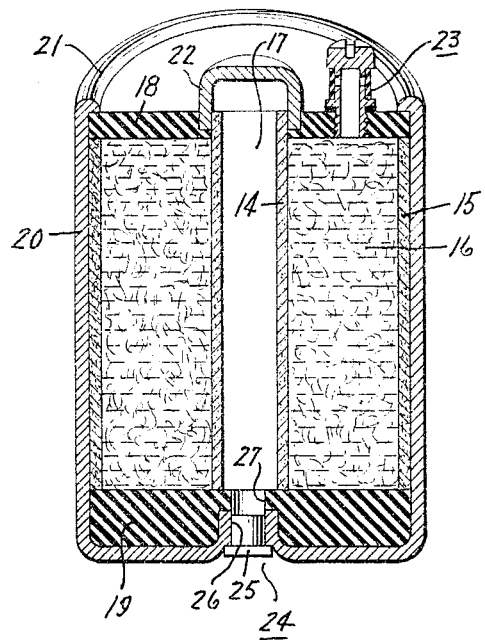
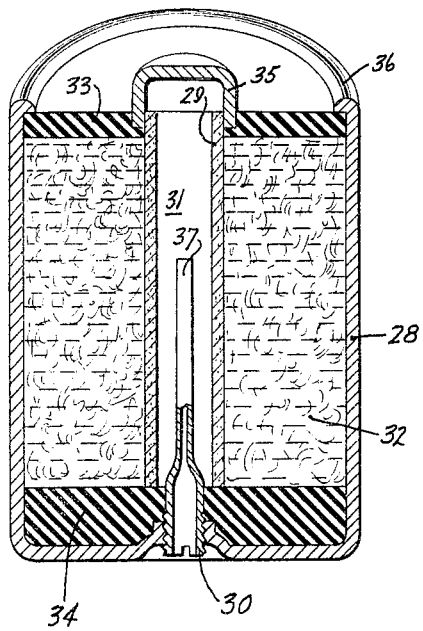
Inventor
William N. Carson, Jr.
by John F. McDevitt
His Attorney

United States Patent Office 3,269,868
Patented August 30, 1966

3,269,868
RESERVE PRIMARY CELL
William N. Carson, Jr., Schenectady, N.Y., assignor to General Electric Company, a corporation of New York
Filed Apr. 22, 1963, Ser. No. 274,646
1 Claim. (Cl. 136—114)

This invention pertains generally to primary galvanic cells having greater performance reliability. More particularly, the present invention pertains to a primary cell utilizing a galvanic couple of zinc and mercuric oxide which is modified for reserve action to promote more reliable operation. Specifically, the present invention pertains to a zinc-mercuric oxide primary cell which is structurally adapted to permit addition of liquid electrolyte just prior to use.

Primary cells utilizing a combination of zinc and mercuric oxide electrodes are well known and commercially available as a portable source of electric power. Conventional cells of this type generally employ a zinc anode in association with a depolarizing cathode of mercuric oxide and are characterized by a fairly constant discharge rate with a given load over most of the cell life. While this cell has been widely accepted commercially, its useful life is drastically reduced if internal parasitic losses occur during storage. One serious problem resulting in self-discharge of the cell is chemical reaction between the zinc anode and the aqueous alkaline electrolyte which reduces the amount of active anode material available for subsequent power generation.

The described difficulty may be eliminated by excluding liquid electrolyte from the cell until time for actual use. This practice yields maximum capacity for any given cell and permits cell storage under environmental conditions where damage to a cell containing electrolyte would occur from freezing of the liquid or at elevated temperatures. Greater reliability in cell performance has become increasingly more important with extended application of battery-powered equipment. Performance reliability is often the controlling consideration in military and space applications where spare cells are not easily provided. Even ordinary battery applications are benefited through increased reliability which facilitates replacement scheduling.

It would also be desirable if the active life remaining in a cell could be readily determined. An ideal method of determining residual life permits evaluation even during operation of the cell. The problem is acute with zinc-mercuric oxide, as there is no known electrical means such as cell voltage measurements for determining the state-of-charge of the cell. However, when a zinc-mercuric oxide cell is discharged, the concentration of zinc ion in the electrolyte increases. Thus, an evaluation of charge state in the cell can be made from analysis of zinc ion in the electrolyte. The analysis can be made by routine chemical determination with an electrolyte sample withdrawn from the cell. Suitable modification of the cell structure permits electrolyte withdrawal even during operation of the cell.

It is one important object of the invention, therefore, to provide a primary cell of the zinc-mercuric oxide type which includes structural means for introducing liquid electrolyte into the cell after construction.

It is another important object of the invention to provide a zinc-mercuric oxide primary cell which contains common structure permitting both addition and removal of liquid electrolyte from the cell.

Still another important object of the invention is to provide a method of determining the charge state in a reserve zinc-mercuric oxide primary cell.

These and other important objects of the invention will be apparent from the following description taken in connection with the accompanying drawings in which:

FIGURE 1 is a partially cross sectional view illustrating a primary cell of the invention;
FIGURE 2 is a cross sectional view of a different primary cell of the invention; and
FIGURE 3 represents a cross sectional view of still a different primary cell of the invention.

Briefly, structural means are provided in a zinc-mercuric oxide primary cell for admitting liquid electrolyte through an opening provided with a removable closure which leads to the storage area for electrolyte in the cell. The exact configuration of the closure means is not deemed critical for practice of the invention and known constructions, such as plugs, caps, and the like, may be employed. Moreover, the closure may be further adapted to provide other useful functions for improved cell performance as described in detail for the embodiments illustrated in the accompanying drawings.

In FIGURE 1 there is represented in cross section a stacked cell arrangement of the invention having a porous zinc anode 1 separated from mercuric oxide cathode 2 by interposed liquid absorbent filler 3 in a metal container 4. A suitable zinc anode may consist of an amalgamated pressed zinc powder pellet which may be fabricated by known technique. Likewise, a pellet of mercuric oxide which may contain minor amounts of graphite provides a suitable depolarizing cathode. The removable closure means 5 for the cell may consist of a threaded stud fastened into an accommodating threaded centrally located opening 6 in the metal container to provide communication with the liquid absorbent filler. In the embodied arrangement, the cell may be completely fabricated with the exception of adding aqueous alkaline electrolyte, thus holding in reserve the entire useful life of the electrodes. Liquid absorbent filler 3 may be fabricated from available porous nonconducting materials having a bibulous nature including alkali resistant fibers, paper, plastic foams, and the like.

Assembly of the structural elements above described into a satisfactory cell may be made by inserting the cathode, anode, and filler into the container in the same order shown in the drawing. The cathode element may be formed or drilled to provide a passageway leading from the closure opening to the filler. An insulating top structure prevents direct physical contact between the anode and the metal container to avoid any internal short circuit in the cell. Fabrication of the top insulator 8 in the same shape depicted in the drawing provides a free space 9 in communication with the filler for an additional supply of liquid electrolyte. A gas-porous but liquid impervious plug 10 in direct contact with the anode provides vent means for the cell during operation to avoid problems associated with gas buildup in a galvanic device. The cell gases are finally exhausted to the atmosphere through centrally located vent hole 11 in the metal terminal cap 12 serving as one connection for the external electrical circuit. Connection of opposite polarity for the electrical circuit may be furnished by contact with the metal container which is in electrical communication with the cathode. A final leak-proof arrangement of the assembled cell may be made simply by crimping top edge 13 of the container until contact is established with insulator 8. Insertion of the removable closure element in the opening provided upon completion of the cell assembly minimizes oxidation of the electrodes and contamination from the surrounding environment to further insure maximum design performance.

In FIGURE 2 there is shown a different reserve cell embodiment utilizing concentrically disposed electrode cylinders in association with other vent means and a removable closure. Anode 14 consists of a porous zinc cylinder disposed as the inner member of the concentric electrode arrangement having an outer cylinder of mercuric oxide for the cathode 15. The annular space defined between the electrode cylinders may again be filled with liquid absorbent filler material 16 to hold a sufficient supply of the electrolyte for operation by capillary action. The internal opening 17 of the anode cylinder provides a reservoir cavity for electrolyte in the cell. Communication between the reservoir cavity and filler material for passage of electrolyte therebetween is provided with the open pore structure of the anode. Suitable anode and cathode elements are readily obtainable and may be provided by compacting powders of the active materials into the desired size cylindrical shape. The electrodes are kept electrically separated with insulating spacers 18 and 19 placed conveniently at the top and bottom of the cylindrical members. Assembly of the cell to form a unitary structure may be accomplished as shown in the drawing with insertion of the components into metal container 20 followed by crimping the upper edge 21 of the container until contact with the top insulator. A suitable terminal cap 22 for the cell may be provided either by pressing the cap on the anode element or forming the top insulator about the cap. A convenient means for venting the cell during operation can be provided with a Bunsen type valve 23 inserted through the upper insulator. This method of venting prevents liquid leakage after electrolyte has been added to the cell while still permitting gas escape. Removable closure means 24 for the cell may consist of a rubber plug 25 inserted into opening 26 provided in the metal container. Opening 27 in the lower insulator allows direct communication with the inner electrode cavity for admission or withdrawal of the cell electrolyte. The present arrangement permits withdrawing a sample of electrolyte from the cell for analysis even during operation simply by puncturing the rubber plug with a hypodermic syringe needle. The rubber plug may be fabricated from any elastomeric self-sealing material which is not unduly degraded by the strong basic electrolyte, for example, 30 percent aqueous KOH solution, conventionally employed in this type cell. It will be obvious that other sampling procedures can be employed to withdraw electrolyte from the cell for analysis depending upon the particular configuration of the removable closure means employed.

As previously stated, the charge state of a zinc-mercuric oxide primary cell may be determined by analysis for zinc ion concentration in the electrolyte. Zinc ion concentration is an index of how far cell discharge has proceeded since the zinc anode reacts with hydroxyl ions during discharge to produce soluble sincate ion in the electrolyte. The concentration of zincate ion may be related to residual life in the cell if the original amount of anode zinc in the cell is known by means of the following mathematical relationship:

$$A\text{-}H = \frac{m - m_0}{Zn/2} \times F$$

where:

$A\text{-}H$ = ampere hours
$m$ = original weight of zinc in the anode less weight of zinc determined in solution (in lbs.)
$m_0$ = residual weight of zinc in the anode when cell is at cut-off voltage (in lbs.)
$F$ = Faraday = a constant with the value of $1.22 \times 10^4$ for zinc
$Zn/2$ = equivalent weight of zinc (in lbs.)

The life remaining in a cell is obtained directly by computation with the above equation after determining the numerical values to be inserted therein. More particularly, the value of $m$ is determined experimentally from the weight of zinc used in fabrication of the anode and the weight of zinc in the electrolyte. The weight difference between these values indicates the zinc still on the anode at time of measurement. A certain amount of zinc still on the anode will be unavailable for further electrochemical reaction depending upon the configuration of the particular anode and other geometrical considerations of the cell design. The unavailable zinc is represented by the $m_0$ quantity in the equation and may be determined by testing a representative number of the cells to obtain a statistical value of the weight of zinc remaining on the anode at cut-off voltage.

A convenient method of determining the weight of zinc in the electrolyte for the above computation is to determine the weight of metal ion in a known volume of solution. Knowledge of the total electrolyte volume in the cell enables calculation of the total weight loss of zinc from the anode at the time of measurement. Obviously, other methods for analysis of zinc in the electrolyte are also utilizable including polarographic analysis such as described by Kolthof and Lingane in a text entitled "Polarography," volume 2, Interscience Press, 1952, New York. Colorometric analyses involving color change of the electrolyte with different zincate ion concentration, indicator paper measurement, and the like may also be used. Relatively small samples of electrolyte, for example, 10 microliters, are generally sufficient for the determination.

While the closure means through which electrolyte is withdrawn for analysis to determine charge state of a cell must be removable to permit the prior addition of electrolyte, it is also contemplated to employ closures permitting electrolyte withdrawal with a closure still in place. Thus, removable closures fabricated with elastomic self-sealing materials, such as natural rubber, butyl rubber, and other organic elastomers, can be punctured to withdraw the electrolyte sample. This procedure permits determination of charge state even during cell operation with the further advantages derived therefrom.

In FIGURE 3 there is shown a modification of the general cell configuration depicted in FIGURE 2 employing different removable closure means of the invention. The cell embodiment comprises zinc anode container 28, mercuric oxide, depolarizing cathode cylinder 29 having a central reservoir cavity for storage of aqueous alkaline electrolyte, and removable closure means 30 in the container for admitting electrolyte to the reservoir cavity. The cathode cylinder wall is sufficiently porous for passage of liquid from the central reservoir cavity 31 to storage space 32 separating the electrodes. The annular space may contain porous dielectric material to hold electrolyte in the pores, as previously described. Likewise, top and bottom insulators 33 and 34, respectively, are positioned in the cell to prevent electrical contact between the anode and cathode. Terminal cap 35 is a continuous member having no provisions for venting gases from the cell therethrough. Assembly of the described cell members into a single unitary structure may be achieved in the same manner hereinbefore described by crimping edges 36 of the anode container onto the top insulator. As will be obvious to those skilled in the battery art, other joining procedures and methods of fabrication may also be employed to provide satisfactory cell constructions of the invention. Closure means 30 may consist of a removable plug having a longer vent tube 37 than the height of reserve electrolyte in the cell. The vent tube permits escape of cell gases without accompanying loss of electrolyte and may be optionally provided with a simple one-way valve (not shown) to further insure the desired result even with upset of the cell.

From the foregoing description, it will be apparent that an improved primary cell having closure means permitting reserve action has been provided. It is not intended to limit the invention to the preferred embodiments above shown, however, since it will be obvious to those skilled in the art that certain modifications of the present teachings can be made without departing from the true spirit and scope of the invention. Thus, it is contemplated to further modify the present primary cell with other known vent features, electrode configurations, electrode compositions, and the like, all of which having removal closure means for adding electrolyte to the cell after construction. Modification of the closure means permitting withdrawal of the liquid electrolyte for determination of charge state in such modified arrangements is also contemplated. It is intended to limit the present invention, therefore, only to the scope of the following claim.

What I claim as new and desire to secure by Letters Patent of the United States is:

The combination comprising
- a first cup-shaped container having an end wall and a cooperating side wall, said end wall having a centrally positioned opening,
- a closure means mounted within said opening,
- an annular mercuric oxide cathode lying in contact with said end wall and spaced from said opening,
- a disk of liquid absorbent filler mounted in said container and contiguously overlying said cathode,
- a pressed zinc powder pellet contiguously overlying said filler disk, said pellet lying within said first container and spaced from said side wall,
- a second cup-shaped metal container having an end wall means and a cooperating side wall means, said end wall means having a centrally positioned opening, said side wall means having a rim portion contacting said pellet, and said end wall means, said side wall means, and said zinc pellet cooperating to form an enclosure,
- a gas-porous, liquid impervious plug means filling said enclosure, and
- an electrically insulative disk lying in said first container having a central opening, said opening receiving said side wall means of said second container, said insulating disk sealingly cooperating with the side wall means of said second container and with the side wall of said first container.

References Cited by the Examiner

UNITED STATES PATENTS

| | | | |
|---|---|---|---|
| 820,047 | 5/1906 | Hirlimann | 136—164.2 X |
| 1,390,524 | 9/1921 | French and Benner | 136—114 |

FOREIGN PATENTS 534,765  3/1941  Great Britain.

OTHER REFERENCES

Storage Batteries, by Vinal, third edition, published by John Wiley & Sons, Inc. in 1940, QC 605 V54, pages 110–111 and 137 relied on.

WINSTON A. DOUGLAS, *Primary Examiner.*

A. SKAPARS, *Assistant Examiner.*